US010521926B1

(12) United States Patent
De Nardi et al.

(10) Patent No.: US 10,521,926 B1
(45) Date of Patent: Dec. 31, 2019

(54) TILEABLE NON-PLANAR STRUCTURED LIGHT PATTERNS FOR WIDE FIELD-OF-VIEW DEPTH SENSING

(71) Applicant: Facebook Technologies, LLC, Menlo Park, CA (US)

(72) Inventors: Renzo De Nardi, Seattle, WA (US); Richard Andrew Newcombe, Seattle, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 15/927,883

(22) Filed: Mar. 21, 2018

(51) Int. Cl.
| | |
|---|---|
| *H04N 7/18* | (2006.01) |
| *H04N 9/47* | (2006.01) |
| *G06T 7/73* | (2017.01) |
| *H04N 13/254* | (2018.01) |
| *G06T 7/521* | (2017.01) |

(52) U.S. Cl.
CPC ............. *G06T 7/73* (2017.01); *G06T 7/521* (2017.01); *H04N 13/254* (2018.05); *G06T 2207/10028* (2013.01)

(58) Field of Classification Search
None
See application file for complete search history.

(56) References Cited

U.S. PATENT DOCUMENTS

| | | |
|---|---|---|
| 4,846,577 A | 7/1989 | Grindon |
| 6,754,370 B1 | 6/2004 | Hall-Holt et al. |
| 8,493,496 B2 | 7/2013 | Freedman et al. |
| 9,098,931 B2 | 8/2015 | Shpunt et al. |
| 2010/0315490 A1 | 12/2010 | Kim et al. |
| 2011/0025827 A1 | 2/2011 | Shpunt et al. |
| 2011/0080471 A1 | 4/2011 | Song et al. |
| 2011/0081072 A1 | 4/2011 | Kawasaki et al. |
| 2014/0307952 A1 | 10/2014 | Sweeney et al. |
| 2014/0362203 A1 | 12/2014 | Delaney et al. |
| 2015/0138346 A1 | 5/2015 | Venkataraman et al. |
| 2016/0025993 A1 | 1/2016 | Mor et al. |
| 2016/0238377 A1 | 8/2016 | Palmen |
| 2017/0142381 A1 | 5/2017 | Kaji |
| 2018/0061034 A1* | 3/2018 | Zhao .................. G02B 27/0172 |
| 2018/0205937 A1* | 7/2018 | Zhu .................... G01B 11/2513 |

* cited by examiner

*Primary Examiner* — Talha M Nawaz
(74) *Attorney, Agent, or Firm* — Fenwick & West LLP (57) ABSTRACT

A head-mounted display (HMD) system includes a projector assembly configured to emit a structured light (SL) pattern onto one or more objects in a local area, the projected SL pattern comprises at least a first SL pattern having a first field of view (FOV) corresponding to a first tileable boundary, and a second SL pattern having a second FOV corresponding to a second tileable boundary. The first and second SL patterns are projected such that the first and second tileable boundaries share at least one edge and collectively define a non-planar surface. A detector assembly is configured to capture one or more images of the one or more objects in the local area illuminated by the tiled SL pattern, such that a location of the HMD may be determined using the one or more captured images.

17 Claims, 7 Drawing Sheets

TILEABLE NON-PLANAR STRUCTURED LIGHT PATTERNS FOR WIDE FIELD-OF-VIEW DEPTH SENSING

BACKGROUND

The present disclosure generally relates to design of a structured light pattern, and specifically relates to generating a tileable structured light projection for wide field-of-view (FOV) depth sensing.

Structured light (SL) patterns may be used to determine a position or orientation of a head-mounted display (HMD) worn by a user within a local area. For example, a projector system may project an SL pattern over objects within a local area. Imaging devices on the HMD capture images of the local area, including at least a portion of the projected SL patterns. The positions of the SL patterns within the captured images is used to determine a depth of the objects relative to the HMD and/or a position of the HMD within the local area.

The SL pattern may be projected using a diffractive optical element (DOE). However, it may be difficult to use a single DOE to project an SL pattern over a wide field-of-view (FOV). For example, using a single wide FOV DOE may lead to large zero-order values compared to other diffraction orders, which may lead to issues in laser safety compliance and algorithm performance.

SUMMARY

In some embodiments, a head-mounted display (HMD) is provided. The HMD system includes a projector assembly configured to emit a structured light (SL) pattern onto one or more objects in a local area, the projected SL pattern comprises at least a first SL pattern having a first field of view (FOV) corresponding to a first tileable boundary, and a second SL pattern having a second FOV corresponding to a second tileable boundary. The first and second SL patterns are projected such that the first and second tileable boundaries share at least one edge and collectively define a non-planar surface. A detector assembly is configured to capture one or more images of the one or more objects in the local area illuminated by the tiled SL pattern, such that a location of the HMD may be determined using the one or more captured images.

In some embodiments, the projector assembly projects the first and second SL patterns by emitting light that is diffracted by first and second respective augmented diffractive optical elements (ADOEs). An ADOE is a diffractive optical element that is designed to diffract light into a SL pattern projection that has a field of view (FOV) corresponding to a respective tileable boundary, and prevents projection of portions of the SL pattern that would otherwise lie outside the respective tileable boundary. In some embodiments, an ADOE is designed by, e.g., making a design pattern such that light diffracted from the ADOE is within a FOV bounded by the respective tileable boundary, and then proceeding with a normal lithography process to form a diffractive element.

In some embodiments, the projector assembly projects multiple SL patterns each corresponding to a respective tileable boundary arranged in a tessellated manner. This allows for the projector assembly to project SL patterns over a wider FOV within the local area, while minimizing gaps or overlaps between different SL patterns. In addition, by projecting the SL patterns such that the tileable boundaries of the SL patterns define a non-planar surface, a more uniform SL pattern may potentially be projected onto objects in the local area.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Structured light (SL) illumination (also referred to as SL pattern projection) with a wide field-of-view (FOV) is crucial for achieving wide FOV depth sensing of target objects. Disclosed embodiments include a method and apparatus for achieving an efficient wide FOV illumination by tiling multiple SL pattern projections in a non-planar arrangement. Each SL pattern projection is associated with a high-performing rectangular FOV pattern projection (or, alternatively, hexagonal, square, etc.) obtained based on one or more diffractive optical elements.

Disclosed embodiments include a head-mounted display (HMD) system having a depth camera assembly (DCA) for determining depth information of one or more objects in a local area. The DCA includes one or more SL sources, a detector, and a controller. Each SL source integrated into the DCA emits a SL pattern projection into the local area. The SL source includes an augmented diffractive optical element (ADOE) illuminated with a plurality of light emitters of the SL source. An ADOE is a diffractive optical element that is designed to diffract light into a SL pattern projection that has a FOV corresponding to a tileable boundary (e.g., rectangular, hexagonal, square, etc.). The ADOE is designed to prevent projection of portions of the SL pattern projection that would otherwise lie outside the tileable boundary, which also saves energy of the SL source. Each ADOE in the DCA generates a SL pattern projection that is projected into the local area in a tileable manner. One or more ADOEs in the DCA are designed such that they generate a tiled light projection which can be easily tiled with other similar projections. The angular spacing between features in each ADOE is constant—and they generally have a barrel shaped boundary that cuts off what would otherwise result in the light projection having a shape that is not easily tileable (e.g., pincushion). The detector of the DCA captures one or more images of the local area illuminated with tiled light projections. The controller of the DCA determines depth information for objects in the local area using the one or more images.

In some embodiments, at least a portion of the DCA is integrated into a head-mounted display (HMD) that captures data describing depth information in a local area surrounding some or all of the HMD. The HMD may be part of, e.g., a virtual reality (VR) system, an augmented reality (AR) system, a mixed reality (MR) system, or some combination thereof. The HMD may further include an electronic display and an optical assembly. The electronic display is configured to emit image light. The optical assembly is configured to direct the image light to an exit pupil of the HMD corresponding to a location of a user's eye, the image light comprising the depth information of the one or more objects in the local area determined by the DCA.

In some embodiments, the DCA with the ADOE is integrated into a station separate from a HMD. In one embodiment, the station is a console interfaced through a wired connection to a HMD. In an alternate embodiment, the station is a base station that wirelessly communicates with the HMD. The DCA of the station captures data describing depth information in an environment surrounding some or all of the station including a user wearing the HMD. The station may provide the depth information to the HMD, which is presented as content to the user.

System Overview

Figure 1:
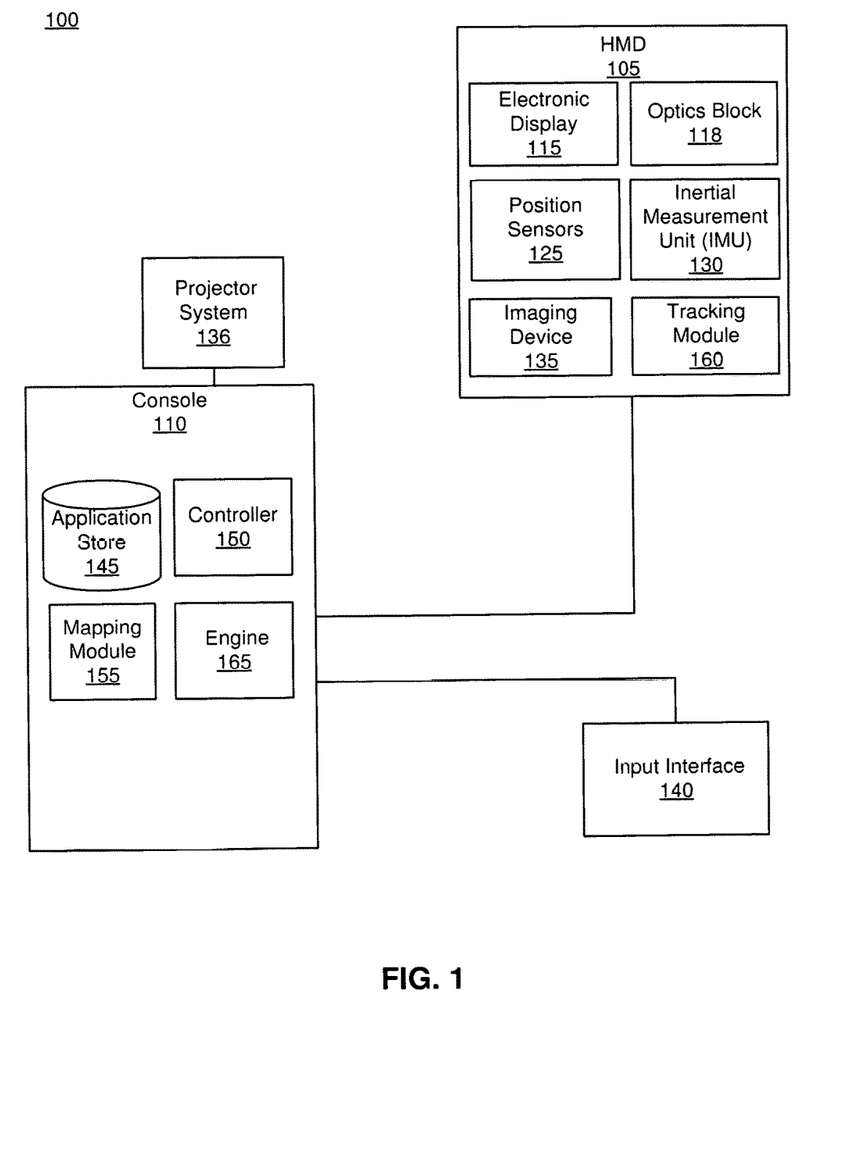
FIG. 1 is a head-mounted display system, in accordance with an embodiment.

FIG. 1 is a block diagram of an HMD system 100, in accordance with an embodiment. The HMD system 100 may operate in a VR system environment, an AR system environment, a MR system environment, or some combination thereof.

The HMD system 100 shown by FIG. 1 comprises a head-mounted display (HMD) 105 that includes a console 110, and an imaging device 135, a projector system 136, and an input interface 140 that are each coupled to the console 110. While FIG. 1 shows an example system 100 including one HMD 105, one projector system 136, and one input interface 140, in other embodiments any number of these components may be included in the system 100. For example, there may be multiple projector systems 136 projecting a plurality of light patterns in a local area including the projector system 136, which the HMD 105 and/or the input interface 140 use to orient themselves within a virtual mapping of the local area. In the preceding example, each HMD 105, input interface 140, projector system 136, and imaging device 135 communicates with the console 110. In alternative configurations, different and/or additional components may be included in the system 100.

The projector system 136 includes one or more projectors that generate and project one or more SL patterns throughout a local area that includes the projector system 136. In some embodiments, the projector system 136 includes one or more light sources that emit coherent light at specific bands (e.g., a range of wavelengths of light). Example bands of light emitted by one or more light sources in the projector system 136 include a visible band (~380 nm to 750 nm), an infrared (IR) band (~750 nm to 1 mm), an ultraviolet band (10 nm to 380 nm), another portion of the electromagnetic spectrum, or some combination thereof. For example, a light source in the projector system 136 can be a laser producing light in the IR band. In some embodiments, a light source of the projector system 136 may be composed of a plurality of laser-type light emitters on a single substrate configured to simultaneously emit a plurality of light beams to form a SL pattern projection.

To generate SL patterns, the projector system 136 comprises one or more diffractive optical elements that are illuminated by the one or more light sources in the projector system 136. The generated light patterns are then projected into the local area by the projector system 136. In some embodiments, the diffractive optical elements comprise one or more ADOEs placed in front of the light sources to form a respective projected SL pattern. As discussed above, an ADOE is a diffractive optical element that is modified to diffract light emitted from an associated light source into a SL pattern projection that has a FOV corresponding to a tileable boundary of a suitable shape (e.g., rectangular, hexagonal, square, etc.). Each ADOE is designed to prevent projection of portions of the SL pattern projection that would otherwise lie outside its associated tileable boundary. In some embodiments, a pattern of the ADOE is designed with a pattern mask to prevent projection of portions of the SL pattern projection that would lie outside the desired tileable boundary.

An SL pattern projection with FOV corresponding to a respective tileable boundary can be combined with at least one other SL pattern projection generated by the projector system 136 to form a tiled light projection that illuminates the local area with a wide FOV. The tiled light projection represents a SL pattern composed of multiple non-overlapping SL pattern projections that illuminates one or more objects in the local area achieving a wide FOV while mitigating distortions. In some embodiments, the multiple non-overlapping projected SL patterns are tessellated to collectively define a planar surface. In other embodiments, the multiple non-overlapping projected SL patterns are tessellated to collectively define a non-planar surface.

An SL pattern as used herein may refer to a pattern or configuration of light beams that may be projected onto one or more objects in a local area surrounding the projector system 136. In some embodiments, a projected SL pattern comprises different light patterns that are associated with different locations in a virtual mapping of the local area, the local area corresponding to a real world environment onto which the projector system 136 projects the SL patterns. For example, a local area may correspond to an interior of a room enclosing the projector system 136 that projects SL patterns onto one or more surfaces within the room (e.g., the walls and ceiling of the room, objects within the room, and/or the like).

In some embodiments, each SL pattern has a unique location configuration, which describes a spatial configuration of light beams of the SL pattern and a reflectance type of the SL pattern. The spatial configuration of an SL pattern describes a number and an arrangement of illuminated regions within the SL pattern, while the reflectance type specifies a band of light (e.g., a range of wavelengths of light) used to generate the SL pattern. In some embodiments, the projector system 136 projects a plurality of SL patterns, of which no two SL patterns have the same unique location configuration. For example, each SL pattern may have a different spatial configuration, but have a common reflectance type. Alternatively, multiple SL patterns may have the same spatial configuration but have different reflectance types.

The projector system 136 generates the SL patterns based upon received emission instructions that control one or more operating parameters of the projector system 136. For example, the emission instructions may indicate operating parameters corresponding to, e.g., wavelength, modulation, pulse rate, pulse duration, amplitude, ADOE selection, some other operation of the projector system 136, or some combination thereof. In some embodiments, emission instructions for the projector system 136 are generated by and received from a controller at a console (e.g., the controller 150 at the console 110).

The HMD 105 may act as a VR, AR, and/or a MR HMD. An MR and/or AR HMD augments views of a physical, real-world environment with computer-generated elements (e.g., images, video, sound, etc.). The HMD 105 presents content to a user. Example content includes images, video, audio, or some combination thereof. Audio content may be presented via a separate device (e.g., speakers and/or headphones) external to the HMD 105 that receives audio information from the HMD 105, the console 110, or both. The HMD 105 includes an electronic display 115, an optics block 118, one or more position sensors 125, an inertial measurement unit (IMU) 130, an imaging device 135, and a tracking module 160. The electronic display 115 displays images to the user in accordance with data received from the console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 118 magnifies received image light, corrects optical errors associated with the image light, and presents the corrected image light to a user of the HMD 105. In various embodiments, the optics block 118 includes one or more optical elements. Example optical elements included in the optics block 118 include: an aperture, a Fresnel lens, a convex lens, a concave lens, a filter, or any other suitable optical element that affects image light. Moreover, the optics block 118 may include combinations of different optical elements. In some embodiments, one or more of the optical elements in the optics block 118 may have one or more coatings, such as anti reflective coatings.

Magnification of the image light by the optics block 118 allows the electronic display 115 to be physically smaller, weigh less, and consume less power than larger displays. Additionally, magnification may increase a field of view of the content presented by the electronic display 115. For example, the field of view of the displayed content is such that the displayed content is presented using almost all (e.g., 110 degrees diagonal), and in some cases all, of the user's field of view. In some embodiments, the amount of magnification may be adjusted by adding or removing optical elements.

The optics block 118 may be designed to correct one or more types of optical error. Examples of optical error include two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, so the optics block 118 corrects the distortion when it receives image light from the electronic display 115 generated based on the content.

The IMU 130 is an electronic device that generates IMU data indicating an estimated position of the HMD 105 relative to an initial position of the HMD 105 based on measurement signals received from one or more of the position sensors 125. A position sensor 125 generates one or more measurement signals in response to motion of the HMD 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals generated by the one or more position sensors 125, the IMU 130 generates IMU data indicating an estimated position of the HMD 105 relative to an initial position of the HMD 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals from various position sensors 125 and calculates the estimated position of the HMD 105 from the sampled data. For example, the IMU 130 integrates the measurement signals received from one or more accelerometers over time to estimate a velocity vector and integrates the velocity vector over time to determine an estimated position of a reference point on the HMD 105. Alternatively, the IMU 130 provides the sampled measurement signals to the console 110, which determines the IMU data. The reference point is a point that may be used to describe the position of the HMD 105. While the reference point may generally be defined as a point in space, in practice the reference point is defined as a point within the HMD 105 (e.g., a center of the IMU 130).

The IMU 130 receives one or more calibration parameters from the console 110. As further discussed below, the one or more calibration parameters are used to maintain tracking of the HMD 105. Based on a received calibration parameter, the IMU 130 may adjust one or more IMU parameters (e.g., sample rate). In some embodiments, certain calibration parameters cause the IMU 130 to update an initial position of the reference point so the initial position of the reference point corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 captures one or more images of the local area surrounding the HMD 105, with at least a set of the captured images including at least one SL pattern projected by the projector system 136. In various embodiments, the imaging device 135 may include one or more cameras, one or more video cameras, any other device capable of capturing images of the SL patterns projected by the projector system 136, or some combination thereof. For example, the imaging device 135 may comprising an RGB camera capable of capturing images in the visible RGB spectrum, an IR camera capable of capturing images in the IR spectrum, or some combination thereof. In some embodiments, the imaging device 135 captures RGB data and IR concurrently, or may interleave capture of RGB data and IR data. In some embodiments, captured RGB data may be used to determine color or texture information of objects in the local area, in addition to depth and/or position information.

Additionally, the imaging device 135 may include one or more filters (e.g., for increasing signal to noise ratio). For example, the one or more filters may comprise one or more bandpass filters based upon one or more wavelength ranges associated with one or more of the projected SL patterns. The imaging device 135 is configured to detect SL patterns in a field of view of the imaging device 135. In various embodiments, the images captured by the imaging device 135 comprise image data that is communicated from the imaging device 135 to the console 110. The imaging device 135 receives one or more calibration parameters from the console 110 to adjust one or more imaging parameters (e.g., focal length, focus, frame rate, ISO, sensor temperature, shutter speed, aperture, etc.) for capturing images of the local area. In alternate embodiments, the imaging device 135 is separate from the HMD 105. For example, one or more imaging devices may be configured to view the local area including the HMD 200 from different vantage points.

The tracking module 160 may track movements of the HMD 105 using captured image data from one or more imaging devices 135. The tracking module 160 may also determine positions of the reference point of the HMD 105 using position information from the IMU data. Additionally, in some embodiments, the tracking module 160 may use portions of the IMU data, the image data, or some combination thereof, to predict a future location of the HMD 105. In some embodiments, the tracking module 160 provides the estimated or predicted future position of the HMD 105 to determine content to be displayed to the user through the electronic display 115 (e.g., using the engine 165 of the console 110).

In some embodiments, the tracking module 160 calibrates the system 100 using one or more calibration parameters and may adjust one or more calibration parameters to reduce error in determination of the position of the HMD 105. For example, the tracking module 160 may adjust the focus of the imaging device 135 to obtain a more accurate position for observed portion of projected SL patterns. Moreover, calibration performed by the tracking module 160 also accounts for information received from the IMU 130 in the HMD 105. Additionally, if tracking of the HMD 105 is lost (e.g., the imaging device 135 loses line of sight of some portion of the projected SL patterns), the tracking module 160 may re-calibrate some or all of the system 100. In some embodiments, the tracking module 160 may be implemented on the console 110 instead of the HMD 105.

The input interface 140 is a device that allows a user to send action requests to the console 110. An action request is a request to perform a particular action. For example, an action request may be to start an application, to end an application, or to perform a particular action within the application. The input interface 140 may include one or more input devices. Example input devices include: a keyboard, a mouse, a game controller, a joystick, a yoke, or any other suitable device for receiving action requests and communicating the received action requests to the console 110. An action request received by the input interface 140 is communicated to the console 110, which performs an action corresponding to the action request. In some embodiments, the input interface 140 may also include an imaging device 135 that captures images of one or more light patterns projected by the projector system 136 and provides the images to the console 110.

The input interface 140 may also include an IMU 130 that captures IMU data indicating an estimated position of the input interface 140 relative to an initial position of the VR interface 140 and provides the IMU data to the console 110. The IMU 130 receives one or more calibration parameters from the console 110. As further discussed below, the one or more calibration parameters are used to maintain tracking of the input interface 140.

The input interface 140 may provide haptic feedback to the user in accordance with instructions received from the console 110 in some embodiments. For example, haptic feedback is provided to the user when an action request is received. As another example, the input interface 140 provides haptic feedback to the user when the console 110 communicates instructions to the input interface 140 causing the input interface 140 to generate haptic feedback when the console 110 performs an action.

The console 110 provides content to the HMD 105 for presentation to the user in accordance with information received from one or more of: the imaging device 135, the HMD 105, and the input interface 140. In the example shown in FIG. 1, the console 110 includes an application store 145, a controller 150, a mapping module 155, and a virtual reality (VR) engine 165. Some embodiments of the console 110 have different components than those described in conjunction with FIG. 1. Similarly, the functions further described below may be distributed among components of the console 110 in different manners than described here in various embodiments.

The application store 145 stores one or more applications for execution by the console 110. An application is a group of instructions, that when executed by a processor, generates content for presentation to the user. Content generated by an application may be in response to inputs received from the user via movement of the HMD 105 or of the input interface 140. Examples of applications include: gaming applications, conferencing applications, video playback application, or other suitable applications.

The controller 150 controls the projector system 136 by generating and providing emission instructions to the projector system 136. In some embodiments, the controller generates emission instructions based upon types of light sources and DOEs available in the projector system 136, one or more user settings (e.g., received via the input interface 140), one or more parameters received from the HMD 105 (e.g., the controller 150 may adjust the emission instructions for the projector system 136 based upon captured image information from the imaging device 135 of the HMD 105), or any combination thereof. In some embodiments, the controller 150 may also generate instructions for the imaging device 135 on the HMD 105 for capturing images of the one or more objects in the local area illuminated by the projected SL patterns.

The mapping module 155 generates a virtual mapping of the local area based on the images of projected SL patterns received from the HMD 105 or from the input interface 140 (e.g., captured using the imaging device 135). For example, the mapping module 155 determines locations of portions of the SL patterns projected in the local area relative to the projector system 136 and to the HMD 105. For example, the mapping module 155 uses image data (e.g., images of portions of the local area) from the HMD 105 to calculate distances from portions of the projected SL patterns to the HMD 105. From the information received from the HMD 105 and the SL pattern information from the projector system 136, the mapping module 155 generates a virtual mapping by associating portions of the projected SL patterns to different locations in a virtual space that overlays the local area.

The VR engine 165 executes applications within the system 100 and receives position information, acceleration information, velocity information, predicted future positions, or some combination thereof, of the HMD 105 from the tracking module 160. Based on the received information, the VR engine 165 determines content to provide to the HMD 105 for presentation to the user. Content may include video information, one or more images, virtual objects, audio information, or some combination thereof. For example, if the received information indicates that the user has looked to the left, the VR engine 165 generates content for the HMD 105 that mirrors the user's movement in a virtual environment. Additionally, the VR engine 165 performs an action within an application executing on the console 110 in response to an action request received from the input interface 140 and provides feedback to the user that the action was performed. The provided feedback may be visual or audible feedback via the HMD 105 or haptic feedback via the input interface 140.

Figure 2:
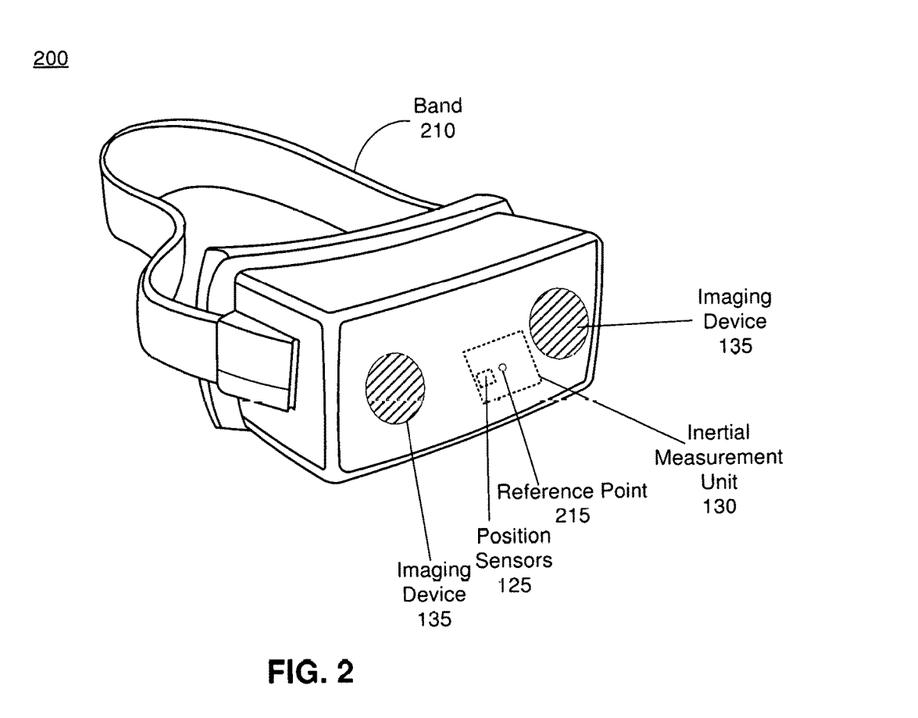
FIG. 2 is a wire diagram of a head-mounted display, in accordance with an embodiment.

FIG. 2 is a wire diagram of a HMD 200, in accordance with an embodiment. The HMD 200 is an embodiment of the HMD 105, and includes a front rigid body 205 and a band 210. The front rigid body 205 includes one or more electronic display elements of the electronic display 115 (not shown), the IMU 130, the one or more position sensors 125, and the imaging device 135. In some embodiments, the imaging device 135 comprises two different cameras, wherein separate images produced by the two cameras are used to determine distance from the HMD 200 to a portion of the SL patterns projected by projector system 136 imaged by both cameras. In some embodiments, the two cameras may be wide angle cameras with overlapping fields of view. In other embodiments, the imaging device 135 may comprise a single camera.

Tileable Light Patterns

In some embodiments, the projector system projections multiple SL patterns into the local area, each associated with a tileable boundary. Each projected SL pattern may share an edge of the tileable boundary with that of another projected SL pattern, minimizing a gap between the projected SL patterns. In addition, because each SL pattern is confined within its respective tileable boundary, an amount of overlap between SL patterns is minimized. As such, the SL patterns may cover a wide FOV of the local area.

Figure 3:
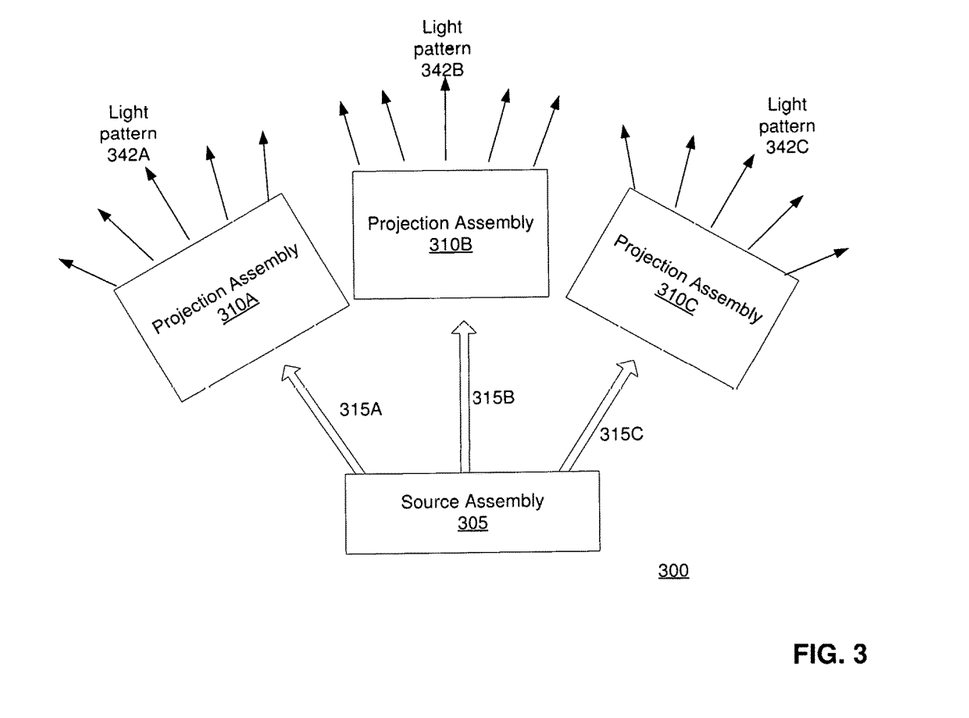
FIG. 3 is a block diagram of a projector system including multiple projection assemblies, in accordance with an embodiment.

FIG. 3 is a block diagram of an embodiment of a projector system 300 including multiple projection assemblies 310A, 310B, and 310C. The projector system 136 is an embodiment of the projector system 300. In the example shown by FIG. 3, the projector system 300 includes a source assembly 305 and projection assemblies 310A, 310B, and 310C. The source assembly 305 is a coherent light source configured to emit coherent beams of light 315 (e.g., beams of light 315A, 315B, and 315C) directed to the projection assemblies 310A through 310C. Examples of the source assembly 305 include a laser diode, a vertical cavity surface emitting laser, a tunable laser, or another light source that emits coherent light. In various embodiments, the source assembly 305 emits light in the IR band; however, in other embodiments, the source assembly 305 emits light in the visible band, in the UV band, or in any other suitable band. In some embodiments, the beams of light 315 may be relatively collimated. However, in some embodiments, the source assembly 305 emits beams of light 315 that are not collimated. For example, the light emitted by the source assembly 305 may be diverging or converging. Hence, in some embodiments, the source assembly 305 also includes a collimator that collimates light from a light source into the beam of light 315. In some embodiments, the different beams of light 315A, 315B, 315C output by the source assembly 305 are in the same ranges of wavelengths. Alternatively, different beams of light 315A, 315B, 315C output by the source assembly 305 are in different ranges of wavelengths. In addition, although FIG. 3 illustrate the beams of light 315A, 315B, and 315C as single beams of light, it is understood that in other embodiments, each beam of light 315A, 315B, 315C may comprise multiple beams of light.

The projection assemblies 310A, 310B, and 310C each receives a respective beam of light 315A, 315B, or 315C emitted from the source assembly 305 and outputs a respective SL pattern. In some embodiments, each of the projection assemblies 310A, 310B, and 310C includes a different ADOE, so each projection assembly 310A, 310B, and 310C outputs a different SL pattern 342A, 342B, and 342C, respectively. In alternate embodiments, the ADOEs in each of the projection assemblies 310A, 310B, and 310C is the same, but each projection assembly 310A, 310B, 310C is illuminated using a different range of wavelengths. For example, beam of light 315A is a particular range of wavelengths, beam of light 315B is a different range of wavelengths, and beam of light 315C is another range of wavelengths. Accordingly, the SL patterns 342A, 342B, and 342C may have the same spatial configuration, but have different reflectance types; thus, each of the SL patterns 342A, 342B, 342C, still has a unique location configuration.

Using multiple projection assemblies 310A, 310B, and 310C allows for the projector system 300 to project SL patterns over a wider FOV, while avoiding the problems of using a single DOE to project a SL pattern over a wide FOV (e.g., large zero-order values relative to other diffraction orders, a large number of diffraction orders, etc.). For example, each of the SL patterns may have an FOV of approximately 60 degrees, allowing the projector system 300 to project SL patterns over a 180 degree view onto the local area. In addition, the use of multiple projection assemblies may allow for a greater density of light beams for each projected SL pattern, potentially allowing a more accurate mapping of the local area.

As discussed above, each of the projection assemblies 310A, 310B, and 310C comprises an ADOE configured to restrict the SL pattern projected by the respective projection assembly to within a tileable boundary. As such, projected SL patterns of adjacent projection assemblies 310A through 310C can be configured to tessellate with each other over the FOV of the projector system 300, with minimal overlap or gaps between adjacent SL patterns.

For example, in some embodiments, each ADOE corresponds to a rectangular boundary. In some embodiments, the formula used to create the appropriate masked pattern for design into the ADOE and preventing projection of specific light that would otherwise lie outside a tileable boundary is given below for generating a SL pattern projection with a rectangular FOV of size $\theta_h$ degree×$\theta_v$ degree:

$$M(i_h, i_v) = \begin{cases} 1, & |(i_h - (n_h + 1))\sin(\alpha_h)| \leq \sin\left(\frac{\theta_h}{2}\right) \text{ AND} \\ & |(i_v - (n_v + 1))\sin(\alpha_v)| \leq \sin\left(\frac{\theta_v}{2}\right) \\ 0, & \text{otherwise} \end{cases} \quad (1)$$

where $\theta_h$ is an angular field of view in a horizontal direction, $\theta_v$ is an angular field of view in a vertical direction, $1 \leq i_h \leq 2n_h+1$, $1 \leq i_v \leq 2n_v+1$, $(2n_h+1) \times (2n_v+1)$ is a size of the original design pattern bitmap, $i_h$ is an integer that represents a horizontal coordinate in the design pattern bitmap, $i_v$ is an integer that represents a vertical coordinate in the design pattern bitmap, $n_h$ is an integer that represents an index in horizontal direction of the design pattern bitmap, $n_v$ is an integer that represents an index in vertical direction of the design pattern bitmap, $M(i_h,i_v)$ is a normalized intensity of an emitted light beam in a position in the design pattern bitmap after being diffracted by the ADOE, $\alpha_h$ is a diffraction order separation in horizontal direction, and $\alpha_v$ is a diffraction order separation in vertical direction. As used herein, horizontal and vertical directions may be based upon a plane associated with the ADOE (e.g., a plane parallel orthogonal to a direction of the zero order diffraction of the ADOE). In some embodiments, the ADOEs of each of the projection assembly 310A, 310B, and 310C may be associated with the same plane. In other embodiments, each of the ADOEs may be associated with different planes.

Although FIG. 3 illustrates each of the projection assemblies 310A, 310B, and 310C as separate components, in some embodiments, two or more ADOE structures of the projection assemblies 310A, 310B, and 310C are printed on the same substrate. Functionally, the ADOEs printed on the same substrate are equivalent to multiple physically separated ADOEs. However, physically, ADOEs printed on the same substrate representing a single part may simplify manufacturability. In addition, although FIG. 3 illustrates a single source assembly 305 projecting multiple beams of light 315A-C towards multiple projection assemblies 310A-C, it is understood that in other embodiments, the projector system 300 may comprise multiple source assemblies 305 (e.g., a different source assembly 305 for each of the projection assemblies 310A-C).

In some embodiments, the SL patterns projected by the projector system are tiled or tessellated such that the projected SL patterns collectively define a curved or non-planar surface. For example, instead of projecting SL patterns that tessellate along a particular plane, each of the projected SL patterns may define a different plane.

Figure 4:
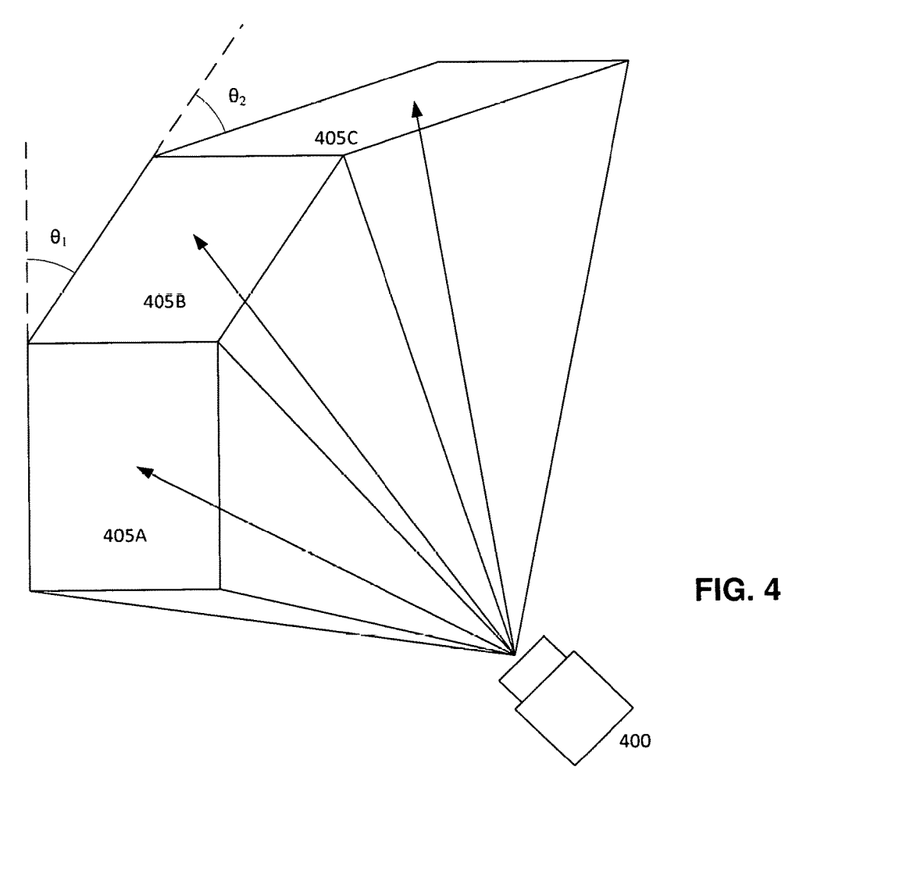
FIG. 4 illustrates a diagram of a projector system projecting tileable light patterns, in accordance with some embodiments.

FIG. 4 illustrates a diagram of a projector system projecting tileable light patterns, in accordance with some embodiments. As discussed above, each projected light pattern projected by the projector system 400 is defined by a boundary having a particular shape. For example, each projected light pattern may have a boundary having a substantially rectangular shape.

The projector system 400 configured to project at least three different structured light patterns (SL patterns 405A, 405B, and 405C). The different projected SL patterns are tiled such that they collectively define a curved or non-planar surface. For example, the first, second, and third SL patterns 405A, 405B, and 405C are arranged such that the planes defined by each SL pattern are offset by an angle (e.g., angles θ1 and θ2) relative to that of the previous SL pattern. In addition, each of the SL patterns may define a substantially equal FOV.

In some embodiments, projecting different SL patterns such that they define a non-planar surface may allow for the projector system to better project SL patterns over objects in the local area surrounding the projector system. For example, the local area may correspond to a room that the projector 400 is located in, wherein different objects in the local area (e.g., walls, ceilings, furniture) may be oriented differently relative to the projector system. By projecting SL patterns defined by different planes, the light beams of the SL pattern may be projected more uniformly over the objects of the local area compared to if the SL patterns are all defined by the same plane (e.g., the vertical plane defined by the first SL pattern 405A as illustrated in FIG. 4), allowing for positions or depths of the objects in the local area to be more easily and accurately calculated.

Figure 5:
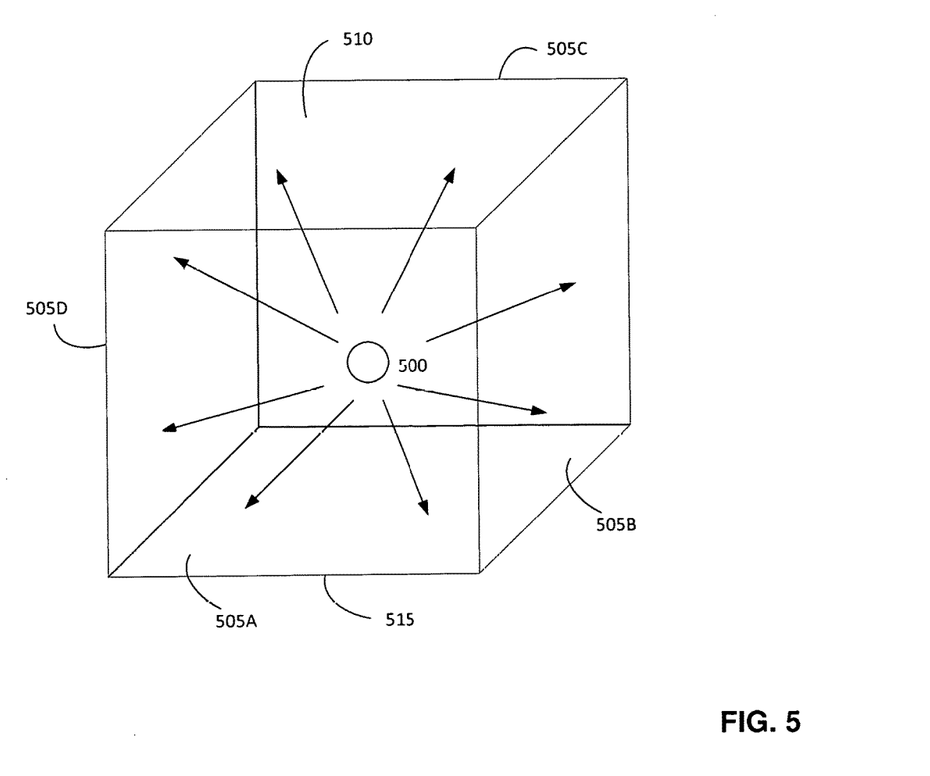
FIG. 5 illustrates another diagram of a projector projecting tileable non-coplanar SL patterns, in accordance with some embodiments.

FIG. 5 illustrates another diagram of a projector projecting tileable non-coplanar SL patterns, in accordance with some embodiments. In some embodiments, the projector system 500 projects a plurality of different SL patterns defined by different planes over a 360° area around the projector. For example, as illustrated in FIG. 5, the projector system 500 is configured to project 6 different SL patterns. Each SL pattern is configured to cover a FOV of approximately 90° from the projector, and are arranged such that the planes defining the SL patterns collectively form a cube around the projector. The six projected SL patterns may comprise four SL patterns 505A through 505D corresponding to four vertical faces of the cube, as well as two additional SL patterns 510 and 515 corresponding respectively to a top face and a bottom face of the cube.

In some embodiments, the projector system 500 may project fewer or more SL patterns than that illustrated in FIG. 5, such that SL patterns will not be projected onto certain portions of the local area. For example, the projector system 500 may be configured to project SL patterns corresponding to the side faces 505A-505D and top face 510, but not the bottom face 515 of the cube, due to a lack of any objects of interest directly below the projector. In some embodiments, the projector system 500 may project a different number of SL patterns and/or SL patterns with different FOVs. For example, in an embodiment, instead of projecting four rectangular SL patterns corresponding to vertical faces surrounding the projector, each with an FOV of approximately 90°, the projector may project three rectangular SL patterns each with an FOV of approximately 120°. In some embodiments, each of the SL patterns illustrated in FIG. 5 may comprise a plurality of smaller coplanar SL patterns.

Although FIGS. 4 and 5 illustrate rectangular SL patterns, it is understood that in other embodiments, projected SL patterns may be defined by boundaries having different shapes. For example, in a particular embodiment, each SL pattern may have a boundary shape corresponding to a pentagon, and wherein the plurality of SL patterns are tiled based upon a shape of a dodecahedron.

Figure 6:
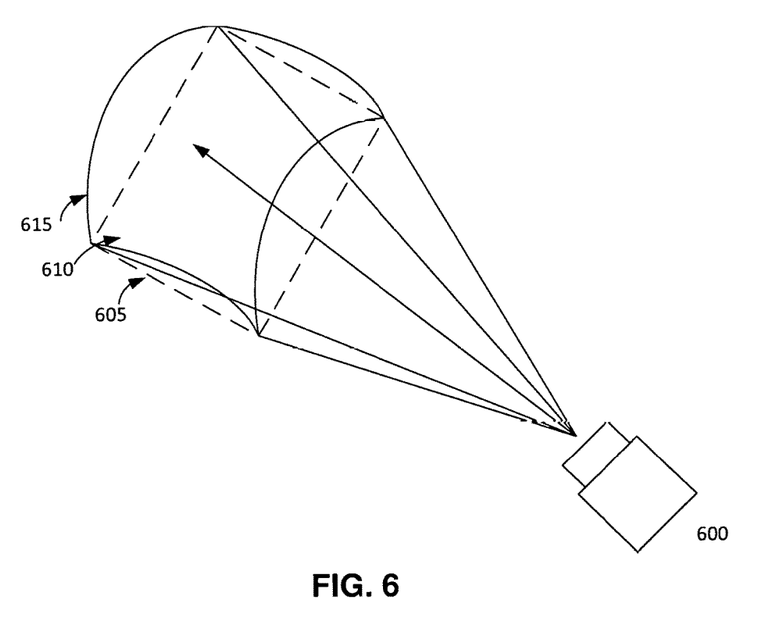
FIG. 6 illustrates a projector projecting a SL pattern associated with a curved surface, in accordance with some embodiments.

In some embodiments, each projected SL pattern may be associated with a curved surface. For example, FIG. 6 illustrates a projector 600 projecting a SL pattern associated with a curved surface. The projected SL pattern may be defined by a boundary 605. The boundary 605 is associated with a plane 610, which corresponds to a plane orthogonal to a direction of the zero order diffraction of an ADOE associated with the SL pattern. In addition, the boundary 605 may be associated with a curved surface 615, which corresponds to a projection of the plane 610.

In some embodiments, the curved surface 615 corresponds to a portion of a surface of a sphere centered at the location of the projector 600. As such, the plurality of SL patterns projected from a projector system may collectively define a sphere. For example, the projector system 500 of FIG. 5 may project 6 SL patterns, each corresponding to a curved surface, wherein the six curved surfaces corresponding to the six SL patterns collectively define a substantially spherical surface.

Figure 7:
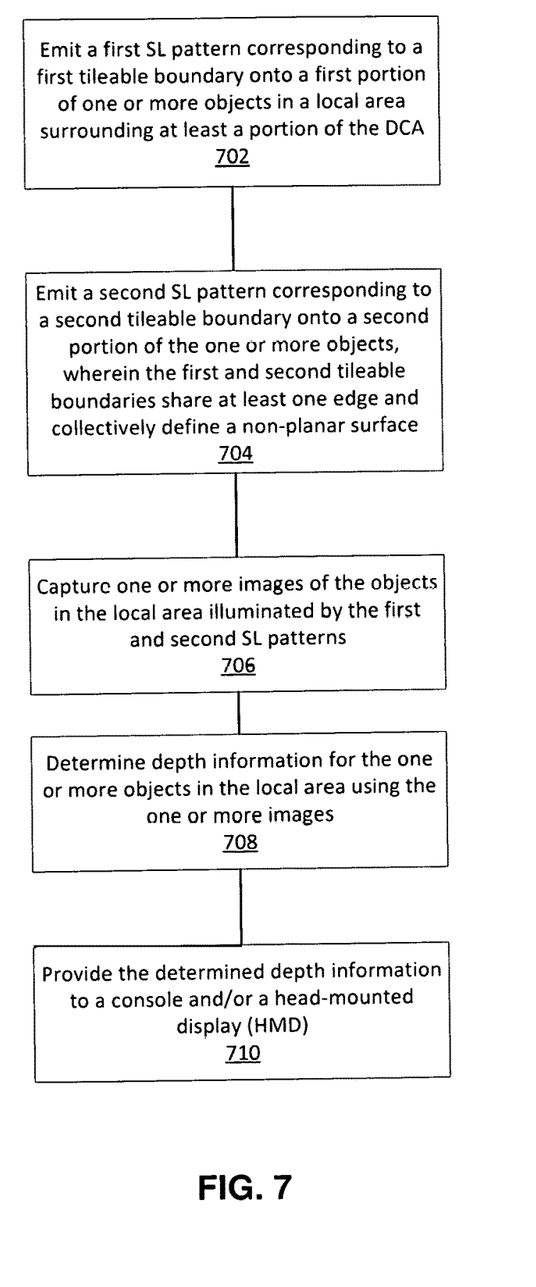
FIG. 7 illustrates a flowchart of a process for projecting SL patterns in accordance with some embodiments.

FIG. 7 illustrates a flowchart of a process for projecting SL patterns in accordance with some embodiments. The process of FIG. 7 may be performed by an HMD system (e.g., the HMD system 100). Other entities (e.g., a HMD) may perform some or all of the steps of the process in other embodiments. Likewise, embodiments may include different and/or additional steps, or perform the steps in different orders.

The HMD system emits 702 (e.g., via the projector system 136) a first SL pattern having a first tileable boundary onto a first portion of one or more objects in a local area surrounding at least a portion of the DCA. In some embodiments, the boundary of the first SL pattern is substantially rectangular in shape, and covers a FOV of approximately 90°.

The HMD system emits 704 a second SL pattern having a second tileable boundary onto a second portion of the one or more objects of the local area, wherein the first and second tileable boundaries of the first and second SL patterns share at least one edge and collectively define a non-planar surface. In some embodiments, the second tileable boundary of the second SL pattern is substantially rectangular in shape, and is non-overlapping with the first tileable boundary. The second SL pattern may cover an FOV of approximately 90°, and be oriented approximately 90° relative to a plane of the first SL pattern.

The HMD system captures 706 via an imaging device (e.g., the imaging device 135) one or more images of the one or more objects in the local area that are illuminated by the first and second SL patterns. In some embodiments, the imaging device is located on an HMD separate from the projector system. In some embodiments, an image of the one or more images may capture a portion of both the first and second SL patterns (e.g., at an area around the shared edge of the first and second SL patterns). In embodiments where the first and second SL patterns are associated with different wavelength ranges, each image of the one or more images may only capture portions of either the first or second SL patterns, but not both.

The HMD system determines 708 depth information for the one or more objects in the local area using the one or more images. For example, the HMD system may use the positions of the first and second SL patterns within the one or more captured images to determine a position of an HMD on which the imaging device is mounted relative to a base station containing the projector system. In some embodiments, the HMD system uses the positions of the SL patterns within the captured images to determine a depth of one or more objects onto which the SL patterns are projected from the imaging device.

The HMD system provides 710 the determined depth information to a console or a HMD of the HMD system. In some embodiments, the console or the HMD may use the determined depth information to generate VR or AR content for display to a user. For example, the console or the HMD may generate one or more virtual objects to be displayed to a user, based upon the detected positions of one or more objects in the local area.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A head-mounted display (HMD), comprising:
    a detector assembly comprising at least one camera configured to capture one or more images of the one or more objects in a local area illuminated by a tiled structured light (SL) pattern generated by a projector assembly, the tiled SL pattern comprising:
        a first SL pattern projected over a first field of view (FOV) corresponding to a first tileable boundary, and
        a second SL pattern projected over a second FOV corresponding to a second tileable boundary,
        wherein the first and second tileable boundaries share at least one edge and collectively define a non-planar surface; and
    a processor comprising a controller configured to determine a location of the HMD using the one or more captured images.

2. The HMD of claim 1, wherein the first SL pattern is projected through a first diffractive optical element (DOE)

comprising a pattern mask that prevents projection of light that would otherwise be diffracted into an area outside the first tileable boundary.

3. The HMD of claim 1, wherein the first and second tileable boundaries collectively define a curved surface.

4. The HMD of claim 1, wherein the first SL pattern has an FOV of 90°.

5. The HMD of claim 1, wherein the first tileable boundary of the first SL pattern defines a first plane, and the second tileable boundary of the second SL pattern defines a second plane, wherein the first and second planes are oriented 90° relative to each other.

6. The HMD of claim 1, wherein the first tileable boundary is rectangular.

7. The HMD of claim 1, wherein the first SL pattern is projected using a first range of wavelengths, and the second SL pattern is projected using a second range of wavelengths different from the first range.

8. The HMD of claim 1, wherein the controller is further configured to provide the determined depth information to a console, and the console is configured to generate content for presentation on an electronic display of the HMD based upon the depth information.

9. A depth camera assembly, comprising:
 a projector assembly configured to emit a structured light (SL) pattern onto one or more objects in a local area, comprising:
  a plurality of light emitters that emit a plurality of light beams;
  a first diffractive optical element (DOE) configured to diffract emitted light beams from a first subset of the plurality of light emitters to form a first SL pattern having a first field of view (FOV) corresponding to a first tileable boundary,
  a second DOE configured to diffract emitted light beams from a second subset of the plurality of light emitters to form a second SL pattern having a second FOV corresponding to a second tileable boundary,
  wherein the first and second tileable boundaries share at least one edge and collectively define a non-planar surface;
 a detector assembly comprising at least one camera configured to capture one or more images of the one or more objects in the local area illuminated by the tiled SL pattern; and
 a processor comprising a controller configured to determine a location of the HMD using the one or more captured images.

10. The depth camera assembly of claim 9, wherein the first DOE comprises a pattern mask that prevents projection of light that would otherwise be diffracted into an area outside the first tileable boundary.

11. The depth camera assembly of claim 9, wherein the first and second tileable boundaries collectively define a curved surface.

12. The depth camera assembly of claim 9, wherein the first SL pattern has an FOV of 90°.

13. The depth camera assembly of claim 9, wherein the first tileable boundary of the first SL pattern defines a first plane, and the second tileable boundary of the second SL pattern defines a second plane, wherein the first and second planes are oriented 90° relative to each other.

14. The depth camera assembly of claim 9, wherein the first tileable boundary is rectangular.

15. The depth camera assembly of claim 9, wherein the first SL pattern is projected using a first range of wavelengths, and the second SL pattern is projected using a second range of wavelengths different from the first range.

16. The depth camera assembly of claim 9, wherein the detector assembly is part of a head-mounted display (HMD).

17. The depth camera assembly of claim 9, wherein the controller is further configured to provide the determined depth information to a console, and the console is configured to generate content for presentation on an electronic display of a head-mounted display (HMD) based upon the depth information.

* * * * *